United States Patent [19]

O'Callaghan

[11] Patent Number: 4,629,150

[45] Date of Patent: Dec. 16, 1986

[54] TRIPOD SUPPORT

[75] Inventor: Brendan O'Callaghan, Bray, Ireland

[73] Assignee: Robin Rennicks, Mulhuddart, Ireland

[21] Appl. No.: 739,081

[22] Filed: May 29, 1985

[30] Foreign Application Priority Data

May 29, 1984 [IE] Ireland .................... 1340/84

[51] Int. Cl.⁴ ............................................. F16M 11/38
[52] U.S. Cl. .................. 248/167; 248/163.1; 248/177
[58] Field of Search .............. 248/167, 163.1, 163.2, 248/188.6, 177, 188, 188.1, 188.2, 463, 464, 465; 354/293; D16/45; 40/606, 610, 612

[56] References Cited

U.S. PATENT DOCUMENTS

| | | | |
|---|---|---|---|
| 2,496,519 | 2/1950 | Culbertson | 248/188 |
| 2,587,511 | 2/1952 | Nerman | 248/188 X |
| 2,633,319 | 3/1953 | Musial | 248/188 X |
| 2,684,822 | 7/1954 | Odin | 354/293 X |
| 3,708,144 | 1/1973 | Nasmith | 248/167 |
| 4,024,851 | 5/1977 | Boda | 248/163.2 X |
| 4,214,724 | 7/1980 | Geiger | 248/167 |
| 4,290,574 | 9/1981 | Archibald | 248/177 |
| 4,453,686 | 6/1984 | Ina | 248/188.6 X |
| 4,502,654 | 3/1985 | Albee | 248/188 X |

FOREIGN PATENT DOCUMENTS

| | | |
|---|---|---|
| 373374 | 5/1932 | United Kingdom . |
| 484418 | 5/1938 | United Kingdom . |
| 739945 | 11/1955 | United Kingdom . |
| 2087227 | 5/1982 | United Kingdom . |

Primary Examiner—Ramon O. Ramirez
Attorney, Agent, or Firm—Birch, Stewart, Kolasch & Birch

[57] ABSTRACT

A tripod support having open and closed positions comprises a housing and three legs which extend downwardly and outwardly from the housing into contact with the ground when the support is in the open position. Two of the legs are rotatable about generally upright axes, referred to the in use open position of the support, to bring the support into the closed position wherein the legs are in a substantially parallel side-by-side relationship.

4 Claims, 7 Drawing Figures

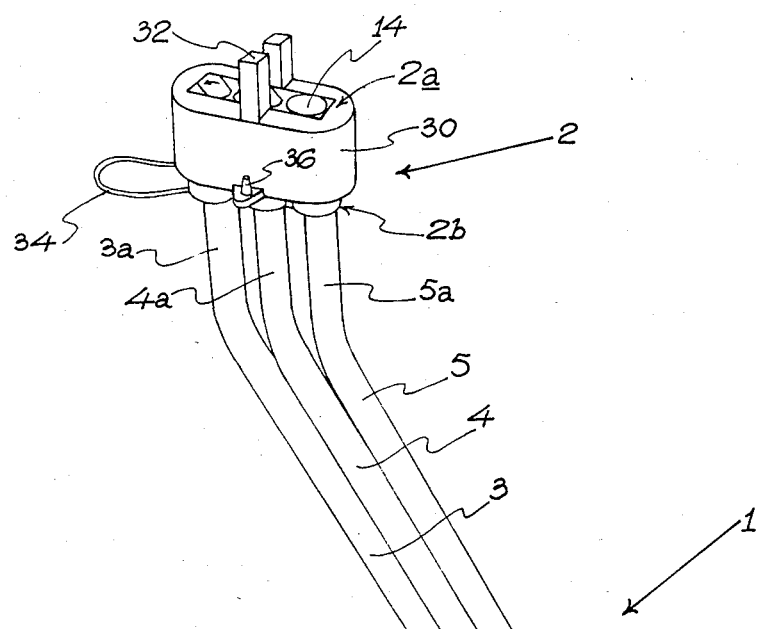
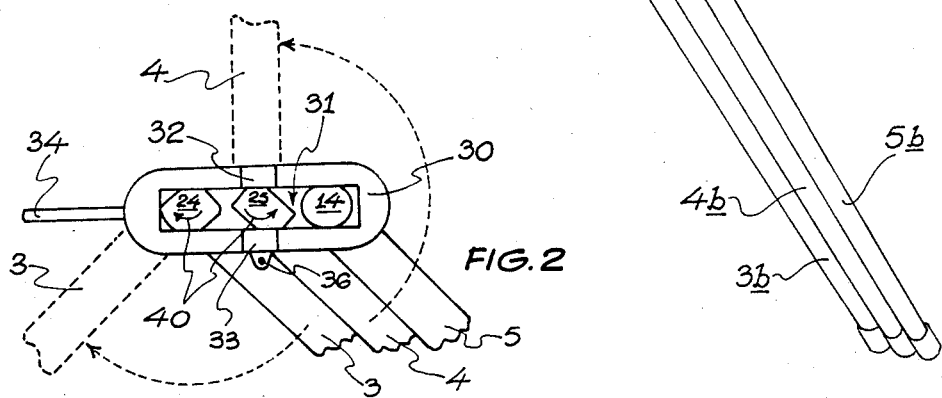
FIG. 1
FIG. 2

TRIPOD SUPPORT

BACKGROUND OF THE INVENTION

This invention relates to a support, in particular, but not exclusively to a tripod.

SUMMARY OF THE INVENTION

The invention therefore provides a multi-legged support having open and closed positions, the support comprising a housing and at least three legs which in use of the support in the open position extend downwardly and outwardly from the housing into contact with the ground, at least two of the legs being rotatable relative to the housing about generally upright axes, referred to the in use open position of the support, to bring the support into the closed position wherein the legs are in a substantially parallel side-by-side relationship.

BRIEF DESCRIPTION OF THE DRAWINGS

The invention will be understood in greater detail from the following description of a preferred embodiment thereof given by way of example only and with reference to the accompanying drawings in which:

FIG. 1 is a perspective view of a support according to the invention in a closed condition;

FIG. 2 is a plan view of the support of FIG. 1;

DETAILED DESCRIPTION OF THE PREFERRED EMBODIMENT

Figure 3:
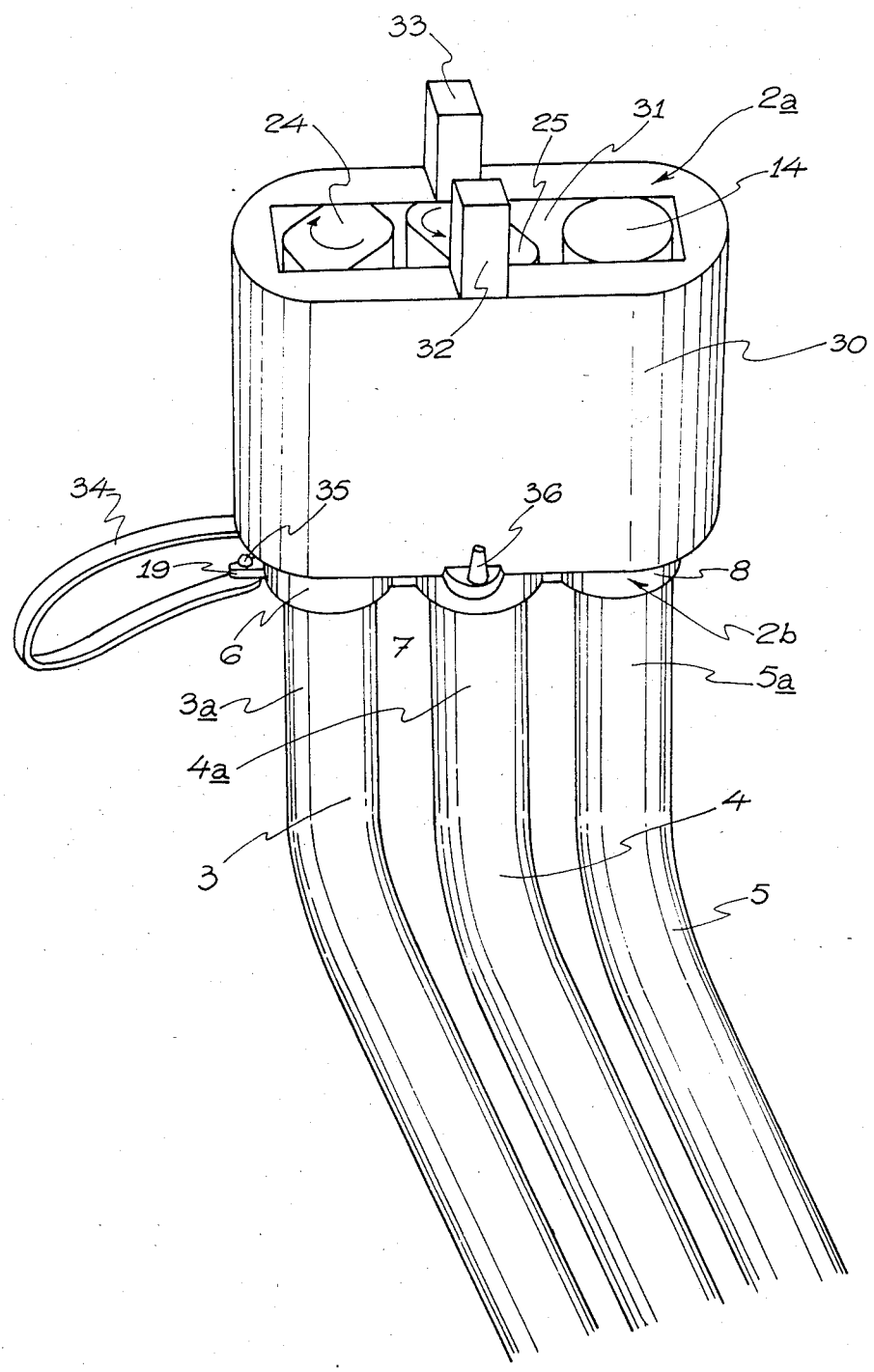
FIG. 3 is an enlarged perspective view of part of the support of FIG. 1.

Referring to the drawings, a tripod 1 comprises a housing 2 having top and bottom sides 2a and 2b respectively, and three similarly shaped angular legs 3, 4 and 5. Each leg has a respective upper end 3a, 4a and 5a mounted in the housing 2, and extends downwardly from the bottom side 2b of the housing 2 to terminate in a respective lower ground-engaging end 3b, 4b and 5b remote from the housing 2. It will be noted that the lower end 3b to 5b of each leg 3 to 5 respectively is laterally offset from the axis of the upper end 3a to 5b respectively, each leg diverging outwardly from the axis of the upper end in the direction towards the lower ground-engaging end.

Figure 5:
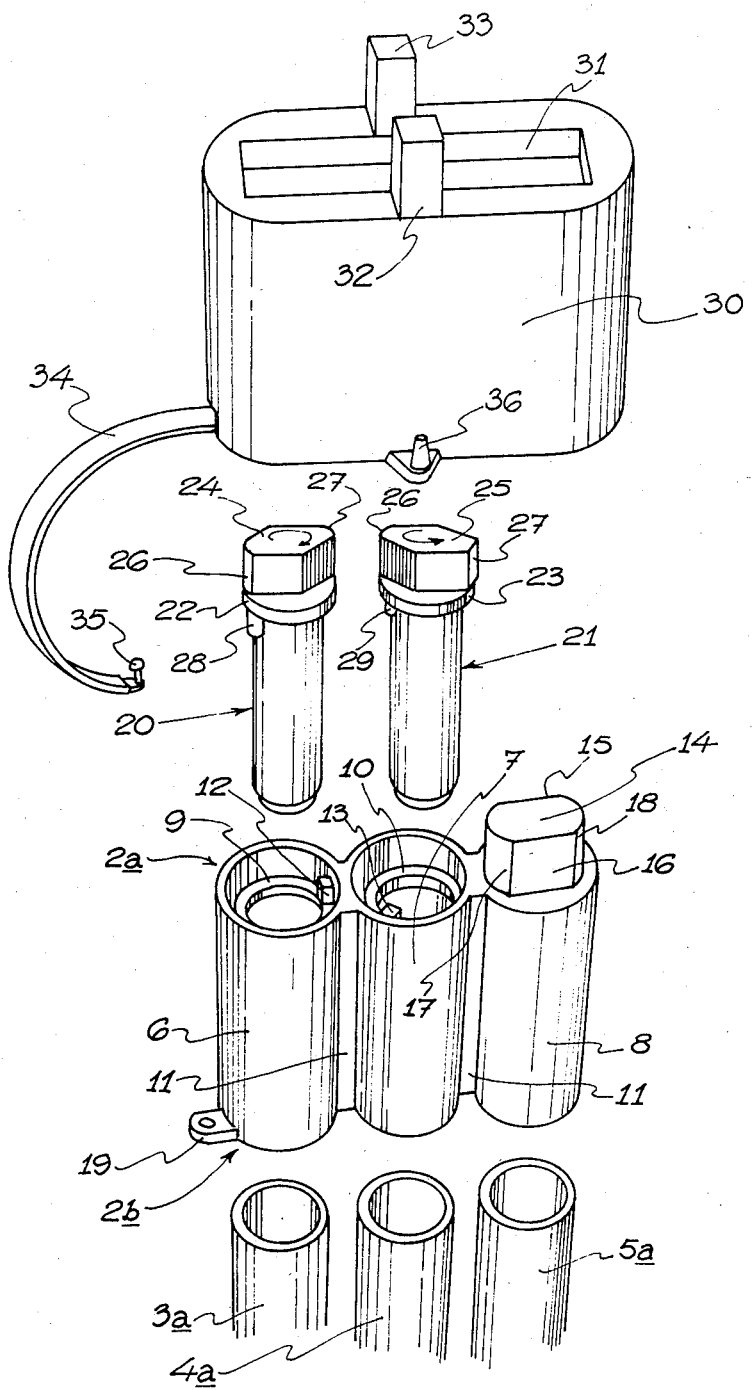
FIG. 5 exploded view of the support of FIG. 3.
Figures 6, 7:
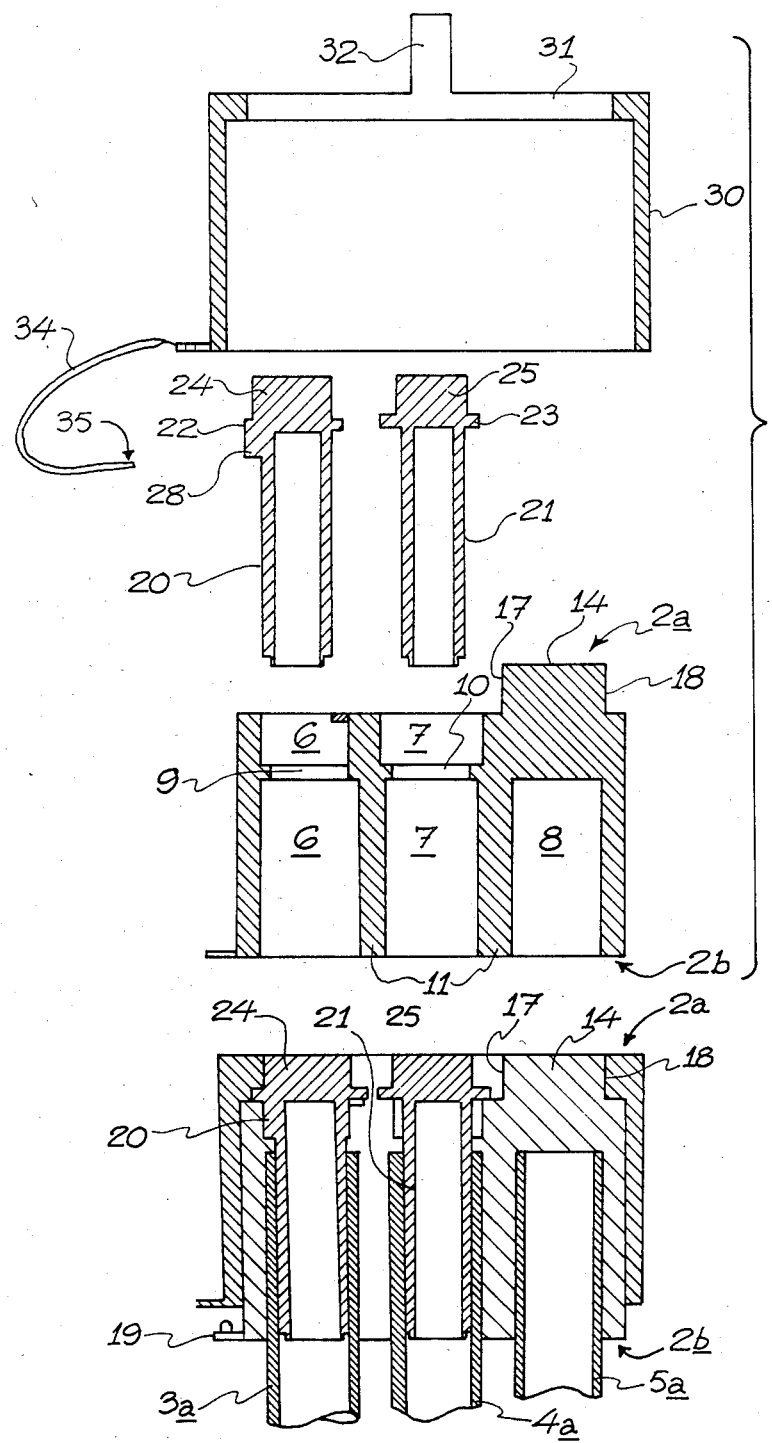
FIG. 6 is a cross-section of the exploded view of the support of 5.
FIG. 7 is a cross-sectional view of the support of FIG. 3.

As shown in FIGS. 5 and 6, the housing 2 comprises three tubes 6, 7 and 8 in parallel spaced apart relationship joined by a web 11. Two of the tubes 6, 7 are open at both ends while the third tube 8 is closed at the top end. The tubes 6, 7 each have an angular projection or neck 9, 10 respectively. Radially projecting from the wall of each tube 6, 7 and located above each neck 9, 10 as viewed in FIG. 5 is a respective stop member 12, 13. Projecting from the closed end of the tube 8 is a cap 14 which, in plan view, comprises two parallel sides 15, 16 joined by two arcuate sides 17, 18. The housing 2 has an eye 19 located at the base of the tube 6.

Into each tube 6, 7 is inserted a respective tubular plug 20, 21. Each of the plugs 20, 21 has a respective flange 22, 23 respectively thereon and supports a respective head 24, 25. In plan, each of the heads 24, 25 is substantially rhomboid shaped, two opposing corners 26, 27 of which are arcuate. Depending from each flange 22, 23 below a respective corner 26 of each head is a respective stop element 28, 29.

To assemble the tripod 1, the upper end 5a of the leg 5 is inserted into the tube 8 and non-rotatably fixed therein. The legs 3, 4 are mounted in the housing 2 as follows. Firstly, the upper end 4a of the leg 4 is inserted from below, as viewed in FIG. 7, into the tube 7. When the top of the leg 4 abuts the bottom of the neck 10, the plug 21 is inserted into the tube 7 from above so that the upper end 4a of the leg 4 is sandwiched between the outside wall of the plug 21 and the inside wall of the tube 7. The plug 21 should be a tight fit in the upper end 4a of the leg 4 such that the plug 21 is non-rotatably secured by friction to the upper end 4a of the leg 4 and therefore the leg 4 will not fall out of the housing 2. However, there should be sufficient tolerance between the inside surface of the tube 7 and the upper end 4a of the leg 4 to permit rotation of the latter relative to the tube 7 of the housing 2, which rotation also causes the plug 21 to rotate.

The leg 3, the plug 20 and the tube 6 are assembled in a similar fashion and, as before, rotation of the upper end 3a of the leg 3 will also cause rotation of the plug 20. It will be noted that the parallel tubes 6, 7 and 8 constrain the upper ends 3a, 4a and 5a of the legs 3 to 5 to lie parallel to one another in the housing 2, each upper end 3a and 4a being rotatable in its respective tube 6 and 7 about its own axis which extends in the top-to-bottom direction of the housing 2.

A cover 30 is provided for the housing 2. The cover 30 in plan view has a rectangular shaped opening 31 therein the purpose of which will be explained below.

Mounted on the cover 30 is a pair of uprights 32 and 33, a flexible connector 34 having a hook 35 thereon, and a hook-like projection 36. Having regard to the device which is to be mounted on the support, the uprights 32, 33 may be replaced by an appropriately shaped formation or connector as required for the secure mounting of the said device.

Having assembled the legs 3, 4 and 5, the plugs 20 and 21 and the housing 2 together, the legs 3 and 4 are rotated relative to the housing 2 so that the legs 3, 4 and 5 are in parallel side-by-side relationship as best seen in FIGS. 1, 2 (solid outline) and 3. This position of the legs 3, 4 and 5 will be referred to as the closed condition of the tripod 1. The cover 30, which is connected to the housing 2 by the flexible connector 34 via the interengagement of the hook 35 with the eye 19, is placed over the housing 2. As can be seen from the drawings, the sides 15, 16 of the cap 14 abut the sides of the opening 31 of the cover 30. Furthermore, in assembling the tripod the orientation of the plugs 20, 21 relative to the upper ends 3a, 4a of the legs 3 and 4 is arranged such that in the closed condition of the tripod two opposing sides of the head 25 and two opposing sides of the head 24 abut the sides of the opening 31 thereby preventing rotation of the legs 3, 4 relative to the housing 2. Furthermore, in the closed condition, each of the stop elements 28, 29 abuts the stop members 12, 13 respectively.

Figure 4:
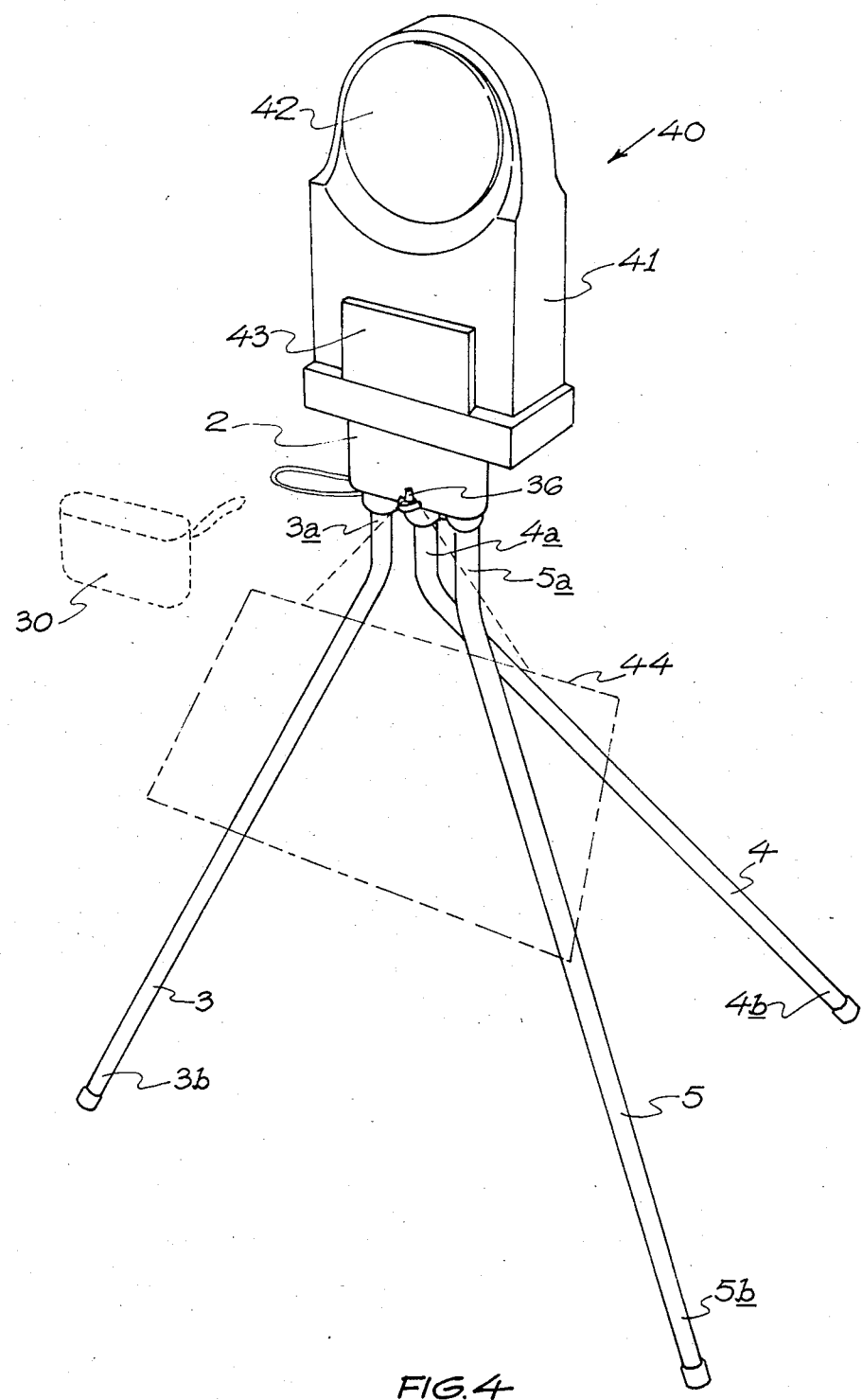
FIG. 4 is a perspective view of the support of FIG. 1 in an open or in use condition.

To place the support in an open condition, wherein the lower ends 3b to 5b of the legs are spaced apart to form a stable stand for the housing 2 as shown in FIG. 2 (dotted outline) and FIG. 4, the cover 30 is removed from the housing 2. The cover 30 will remain attached to the housing 2 by virtue of the connector 34. Then, as viewed in FIG. 2, the leg 4 is rotated anti-clockwise and the leg 3 rotated clockwise relative to the housing 2. To assist the user, the heads 24, 25 may have arrows 40 thereon which indicate the correct rotational movement of the legs to bring the tripod 1 to an open position. In rotating the legs 3, 4 as described, the plugs 20, 21 together with the respective heads 24, 25 will rotate. When the plugs 20, 21 have rotated approximately 120°, each of the stop elements 28, 29 will now abut the stop members 12, 13 respectively, to prevent further rotation, in the directions referred to, of the legs 3, 4. The support 1 is now in an open condition and it will be apparent that when the cover 30 is placed over the housing 2, the sides of the head 24 and the sides of the head 25 abut the sides of the opening 31 of the cover 30. The legs 3, 4 and 5 are now locked in the open condition.

In the open condition, the triangle generated by the legs 3, 5 and the ground is an equilateral triangle while the triangle generated by the legs 3, 4 and the ground or legs 4, 5 and the ground each form an isoscles triangle, the legs 3, 4 and 5 being of equal length. Furthermore, the plane of the equilateral triangle is at an angle of about 10° with respect to the vertical. In addition, a perpendicular line drawn from the platform to the ground will not meet the ground at a point equidistant from the ground engaging ends of the legs but rather will be nearer to and approximately mid-way between a line drawn between the ground engaging ends of the legs 3, 5.

An appropriate device may now be mounted on the cover 30.

In FIG. 4 of the drawings, an example of such a device 40 is shown. The device 40 is a warning lamp of the type used to indicate a hazard on the road. The device 40 comprises a housing 41 having a lens 42 and a reflector 43. The base of the housing 41 is adapted to engage firmly with the uprights 32, 33 and rests on top of the cover 30. It is important that a stable tripod be provided for the device 40 to ensure that at least the reflector 43 is positioned so that a motorist can see at least the reflector at night. The tripod 1 of the present invention provides such a stable support.

If desired, an eye readable sign 44 may be hung from the hook 36 and further supported by releasable engagement with the legs 3, 5 of the tripod 1. Having regard to the 10° angle referred to above, it has been found that the slope of the sign 44 when resting against the legs 3, 5 enables the sign to be read with ease by an oncoming motorist. Furthermore, the sign 44 may be of the type which will fold when the support is placed in the closed condition. To prevent the support 1 from being blown over due to relatively high wind speeds, a suitable weight (not shown) may be hung from the leg 4 in a conventional manner.

The legs 3, 4 and 5 of the tripod 1 may be of any suitable metal or plastics material—although light tubular metal legs are preferred. The components of the housing 2 are preferably moulded from unfilled nylon type 6.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A multi-legged support having open and closed positions, the support comprising:
    a housing and at least threeee legs which in use of the support in the open position extend downwardly and outwardly from the housing into contact with the ground;
    at least two of the legs being rotatable relative to the housing about generally upright axes, referred to the in use open position of the support, to bring the support into the closed position wherein the legs are in a substantially parallel side-by-side relationship; and
    locking means for locking the legs in the open position and/or in the closed position, said locking means includes a respective multi-sided head non-rotatably fixed relative to an upper end of each rotatable leg and a removable housing cover which co-operates with the sides of each head to lock the head in a selected one of two angular positions corresponding respectively to the closed and open positions of the legs.

2. A support according to claim 1, wherein there are only three legs of which one leg is non-rotatably fixed relatively to the housing.

3. A support comprising:
    a housing having a top side and a bottom side and at least three legs each mounted on the housing by an upper end and extending downwardly from the bottom side of the housing to terminate in a respective ground-engaging end remote from the housing;
    the upper ends of at least two legs being rotatable about respective axes extending in the top-to-bottom direction of the housing with the ground-engaging end of each such leg being laterally offset from the rotational axis of the upper end thereof;
    whereby the legs may be rotated between a first position wherein all the legs of the support are in a substantially parallel side-by-side relationship and a second position wherein the ground-engaging ends of the legs are spaced apart to form a stable stand for the housing;
    said upper ends of said at least two legs are disposed substantially parallel to one another in the housing and each is rotatable about its own axis, each of the said two legs diverging outwardly from the axis of the upper end in the direction towards the ground-engaging end; and
    locking means for locking the legs in the open position and/or in the closed position, said locking means includes a respective multi-sided head non-rotatably fixed relative to an upper end of each rotatable leg and a removable housing cover which co-operates with the sides of each head to lock the head in a selected one of two angular positions corresponding respectively to the first and second positions of the legs.

4. A support according to claim 3, wherein there are only three legs of which one leg is non-rotatably fixed relatively to the housing.

* * * * *